Aug. 12, 1930.    R. T. ROMINE    1,772,733
INDUSTRIAL TRUCK
Filed Oct. 28, 1926    5 Sheets-Sheet 2
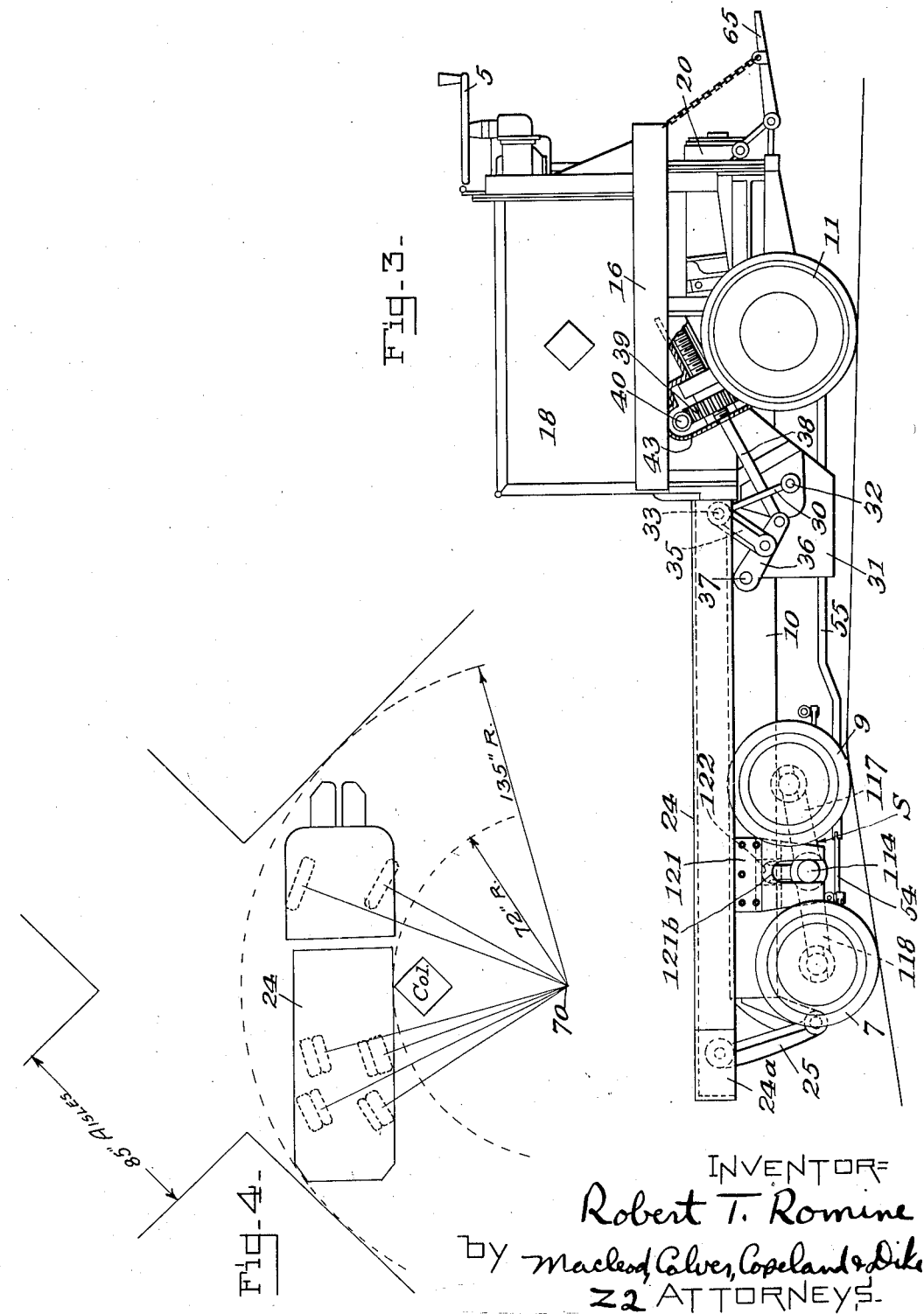

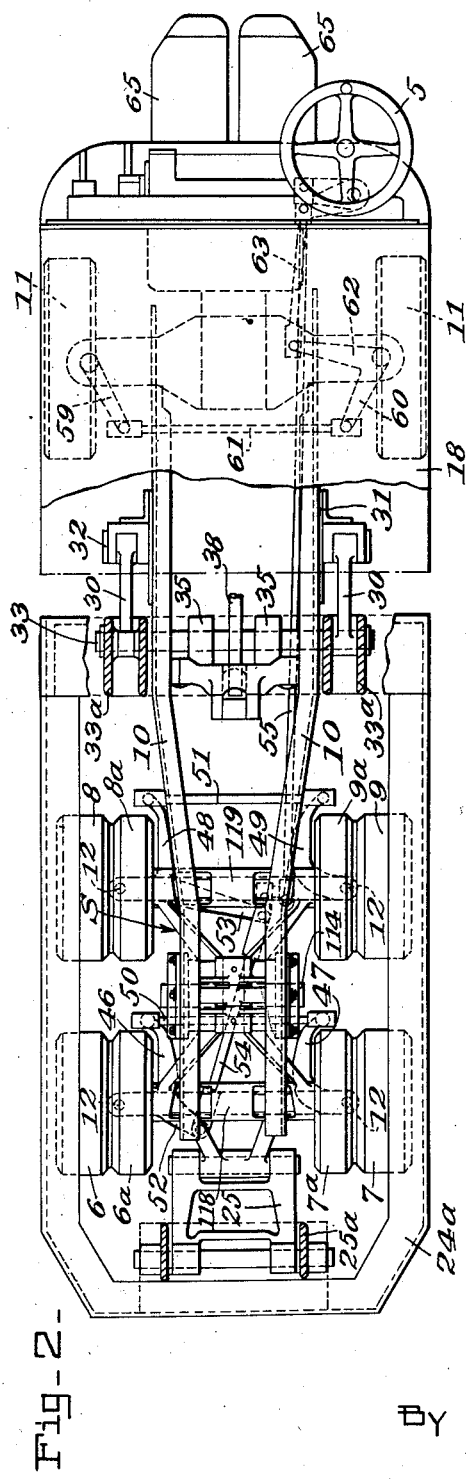

Aug. 12, 1930.                R. T. ROMINE                1,772,733
                            INDUSTRIAL TRUCK
                      Filed Oct. 28, 1926        5 Sheets-Sheet 3
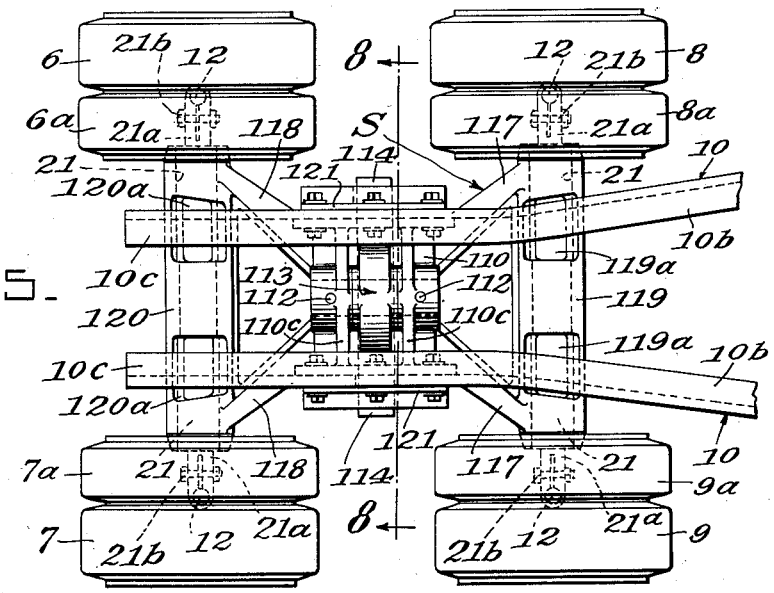
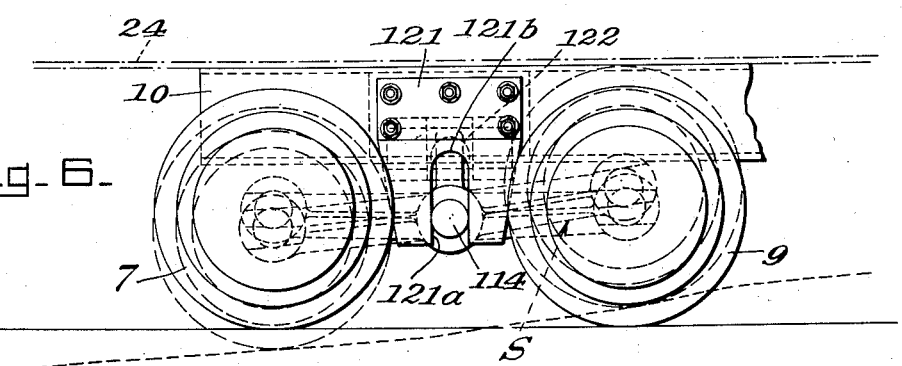
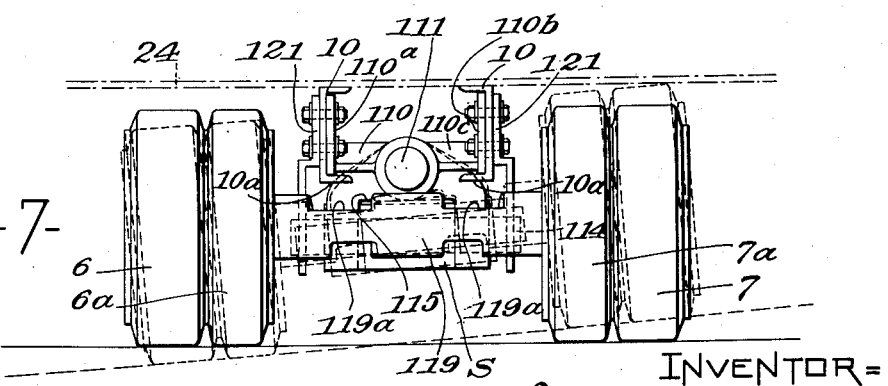
INVENTOR=
Robert T. Romine
By Macleod, Calver, Copeland & Dike
            ZZ ATTORNEYS Aug. 12, 1930.　　　R. T. ROMINE　　　1,772,733
INDUSTRIAL TRUCK
Filed Oct. 28, 1926　　　5 Sheets-Sheet 4
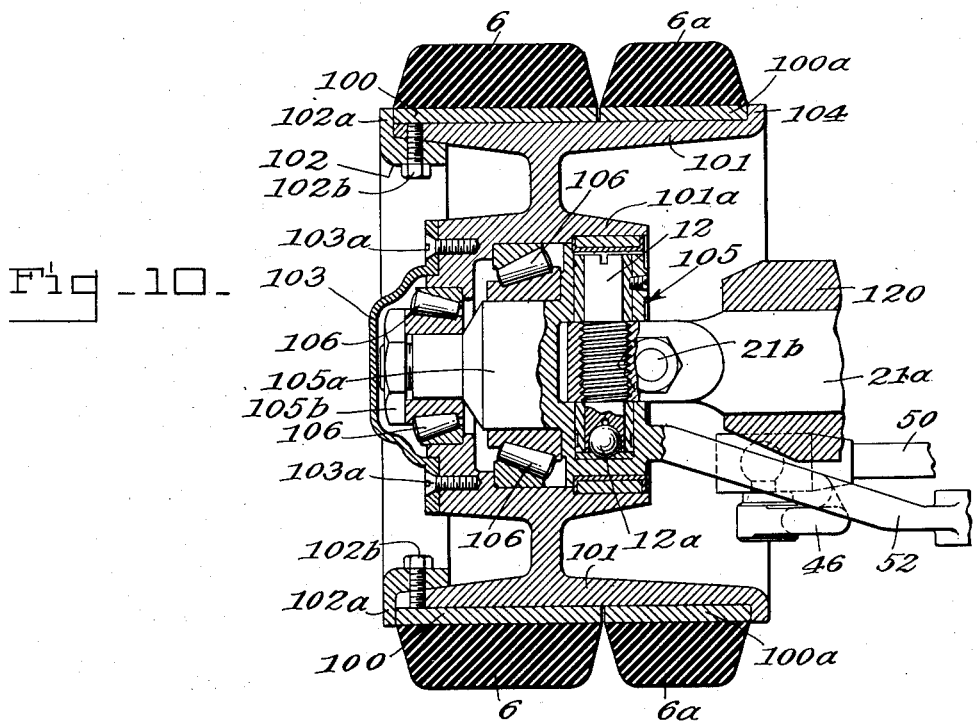
Fig-10-
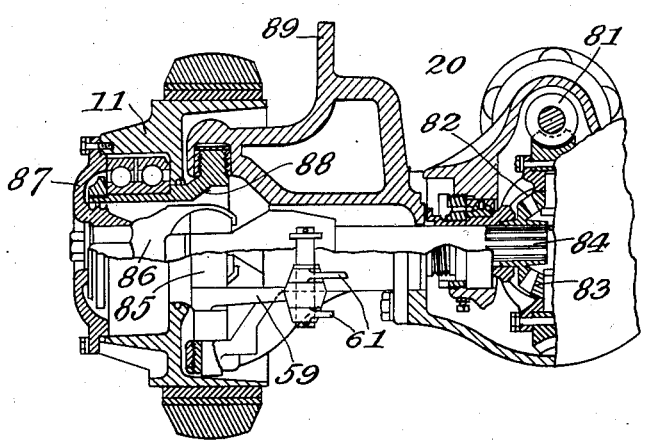
Fig-11-
INVENTOR=
Robert T. Romine
by Macleod, Calver, Copeland & Dike
ATTORNEYS-

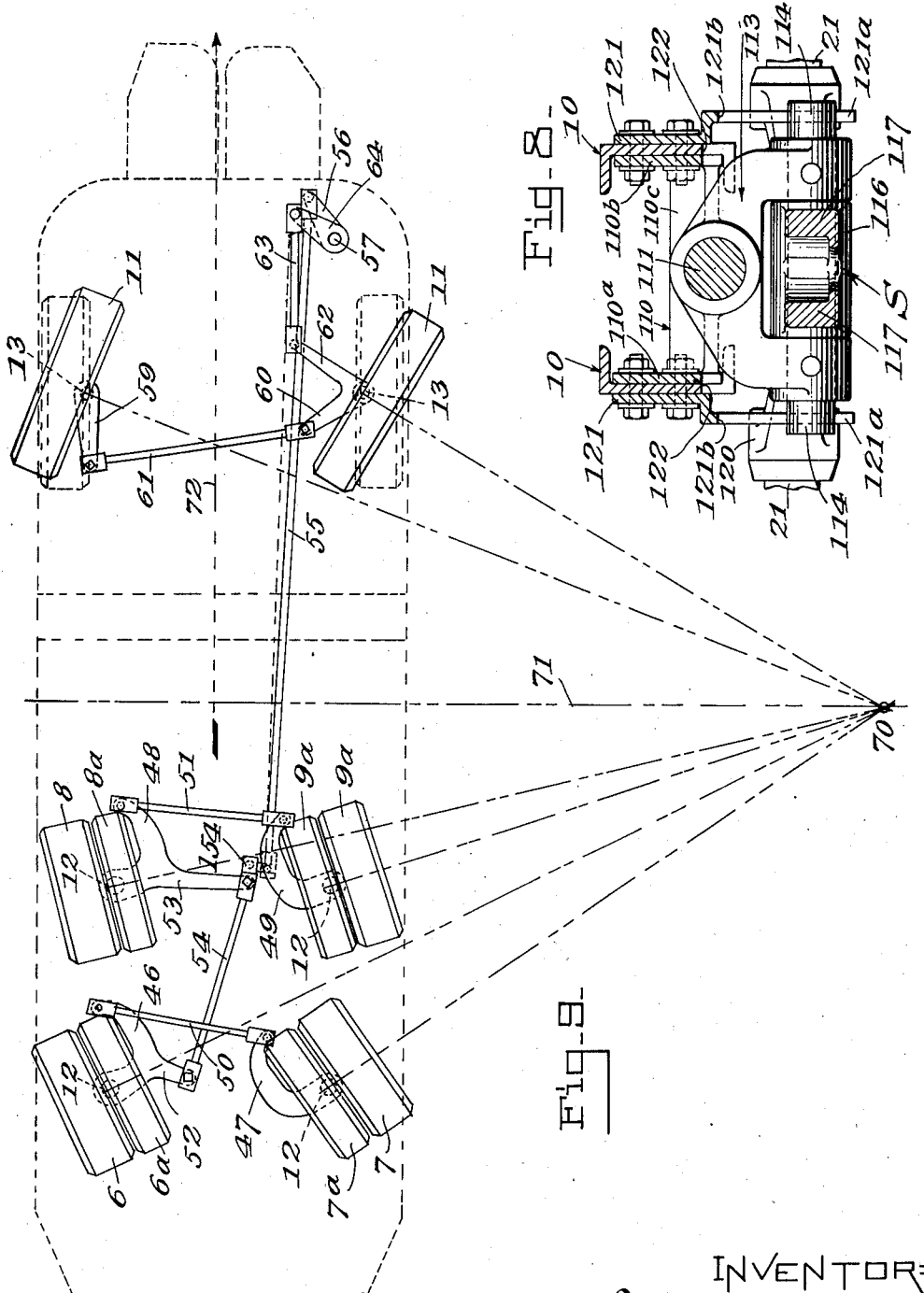

Patented Aug. 12, 1930

1,772,733

UNITED STATES PATENT OFFICE

ROBERT T. ROMINE, OF MOUNT CLEMENS, MICHIGAN

INDUSTRIAL TRUCK

Application filed October 28, 1926. Serial No. 144,723.

This invention relates to industrial trucks and more particularly to that class having a relatively low load elevating platform adapted to be introduced or propelled beneath a loaded portable platform for elevating the same and thereafter transporting the platform with its load to a predetermined point of delivery.

An object of this invention is to provide a power driven lift truck of the foregoing class having a load elevating platform and operating mechanism therefor capable of lifting and transporting heavy loads, such as loads of five and ten tons, or more and in which the truck is provided with sets of relatively wide load carrying wheels capable of being steered on predetermined diverging axes while at the same time mounted in predefined positions beneath the lift platform so as to properly distribute the loads at all times and under varying conditions.

A further object of the invention is to provide a truck capable of carrying out the foregoing purposes and in which all of the load carrying wheels together with the driving wheels are dirigible, with a common steering control provided for turning all of the wheels of the truck about substantially a common center, and in which the load wheels are supported for rocking movement or articulation to conform to irregular ground and irrespective of the positions of the lift platform. By virtue of this invention the truck is constructed to enable it to pick up and transport loads three to five times as great as previous trucks of this class while at the same time having a proportionately shorter turning radius. In short, my invention permits the provision of a truck of the load elevating platform type having a considerably greater load capacity than heretofore, capable of operating safely on factory floors, and which can be operated in the restricted aisle spaces of the factory and steered to negotiate aisle corners in the plant where previous trucks with a maximum capacity of two or three tons were used.

This invention has resulted in revolutionizing the handling of material in factories, freight yards, etc., and particularly in automobile plants and steel mills. It has enabled loads five times as heavy as the capacity of previous trucks of this type to be transported in factory yards and on the floors of the plants, which heretofore was never considered possible. It has enabled loads, such as ten to fifteen tons, to be transported in the yards over uneven ground and in restricted aisle spaces of the plants with greater ease and efficiency than in the case of two ton loads carried by the old standard type two ton trucks.

Other objects of this invention will appear in the following description and appended claims, reference being had to the accompanying drawings forming a part of this specification wherein like reference characters designate corresponding parts in the several views In said drawings:

Fig. 1 is a side elevation of an industrial truck of the load elevating platform type embodying my invention.

Fig. 2 is a plan view of the construction shown in Fig. 1 with parts broken away to show the mechanism beneath the lift platform.

Fig. 3 is a side elevation of the truck, similar to Fig. 1, but illustrating the longitudinal articulation of the load wheels with the lift platform in elevated position.

Fig. 4 is a diagrammatic view illustrating the steering adaptability of the truck in the aisles of the factory.

Fig. 5 is a fragmentary plan view showing the manner in which the load carrying wheels are mounted on the chassis sills.

Fig. 6 is a side elevation of the construction shown in Fig. 5 and illustrating the longitudinal articulation of the wheels.

Fig. 7 is an end elevation of the wheel assembly illustrating the side articulation of the wheels.

Fig. 8 is a transverse section taken substantially on lines 8—8 of Fig. 5.

Fig. 9 is a diagrammatic plan view showing the manner in which the load carrying wheels and driving wheels are steered.

Fig. 10 is a sectional view showing a way in which the load carrying wheels may be constructed.

Fig. 11 is a fragmentary transverse section illustrating the assembly of the rear driving wheels.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

Referring to the drawings, wherein I have illustrated a present preferred form of my invention, the truck comprises a relatively low chassis or frame comprising spaced lengthwise extending sills or side bars 10° which in the present instance are in the form of structural steel channels. The truck is provided at its rear end with a pair of driving wheels 11 mounted on the chassis. Extending upwardly from the rear end of the chassis 10 is a housing or frame structure designated in general at 16 forming a platform support for a housing or casing 18 within which is carried the battery for the motors. A motor 20 is supported beneath the battery casing or housing 18 and is connected by mechanism hereinafter described to the driving wheels 11 for the purpose of driving the same.

A load elevating platform 24 extends forwardly from the frame structure 16 above the front portion of the chassis frame 10, and is pivotally attached thereto at its forward end by means of a link frame 25 in any suitable manner such as by pins and brackets indicated at 25ª. The rear end of the load elevating platform 24 is connected to the frame as well as to a motor 42 by means of a compound toggle mechanism. As shown in Figs. 2 and 3 this toggle mechanism in the present instance comprises a pair of links 30 attached at their lower ends to plates 31 by means of pivot pins 32. The plates 31 are attached to the side bars of the chassis 10 and depend therefrom. The upper ends of the links 30 are pivotally connected to the elevating platform 24 by means of a transverse bar 33 which is secured to suitable brackets 33ª depending from the under side of the platform. Located intermediate the chassis side bars or sills is a second link frame 35 connected at its upper end by means of the pivot bar 33 to the platform, and at its lower end pivoted to a link frame 36 intermediate the ends of the latter. The link frame 36 is pivoted at one end thereof to the chassis side bars by a transverse bar 37, and at its opposite end is pivotally attached to a threaded rod or ram 38.

Mounted on the ram 38 is a worm gear 39, the hub of which comprises a nut engaging the threads formed on the ram or shaft 38. The worm gear 39 is driven by a worm 40 and the latter is mounted on the shaft of an electrical motor 42. This motor 42 is electrically connected to the battery within the housing 18 and is controlled by suitable mechanism at the rear or operator's end 65 of the truck.

When the rod or ram 38 is retracted or drawn upwardly to operate the toggle mechanism, the elevating platform 24 is raised from the position shown in Fig. 1 to the position shown in Fig. 3, and hence the ram 38 will have a swinging movement. The motor 42, worm gear, etc., are accordingly mounted in a casing 43 which may be pivotally mounted at 44 (see Fig. 1) to permit the ram 38 to swing.

The truck is propelled by means of the motor 20 which is operatively connected to the driving wheels 11. The driving mechanism for these wheels is shown in Fig. 11 and comprises in general a worm 81 mounted on the motor shaft which meshes with a worm gear 82, the latter driving a shaft 84 through the medium of worm differential gears 83, the shaft 84 being connected to the wheel spindle 86 through the medium of a universal joint 85. The spindle 86 is drivingly connected to the wheel 11 by a closure plate 87 attached to the end of the spindle 86 and to the hub of the wheel 11. Each of the driving wheels 11 is carried on a hollow sleeve 88 to which the steering arms 59 and 60 hereinafter described are rigidly attached. The sleeve 88 may be mounted upon the gear and shaft housing 89, while the latter is secured to the chassis frame 10.

Mounted beneath the load elevating platform 24 are a number of load carrying wheels of relatively small diameter and having each a relatively wide bearing surface. In the present instance, eight load carrying wheels are mounted beneath the load elevating platform, these wheels being arranged in pairs and constructed to distribute the weight of the load over a considerable surface. These load carrying wheels comprise two sets of forward wheels 6, 6ª and 7, 7ª and two sets of wheels 8, 8ª and 9, 9ª in rear thereof. All of the load carrying wheels are mounted so as to turn relative to the chassis about a common turning center, and the wheels are carried by a sub-frame structure generally designated at S which in the present instance is pivotally carried by the chassis sills 10 so as to rock or articulate longitudinally and transversely.

As shown in Figs. 2 and 5, the chassis side bars 10 converge at 10$^b$ so as to provide parallel portions 10$^c$, relatively close together, at the forward end of the truck and extending between the pairs of load carrying wheels. By this construction the load carrying wheels may be mounted at outer sides of the chassis sills between the vertical side flanges 24$^a$ of the lift platform and the sills, and the wheels may therefore extend above the bottoms of the sills. This construction provides an extremely low drop of the lift platform.

Referring to Figs. 5 to 8 inclusive the rocking frame structure S for carrying the wheels 6—9 comprises in the present instance an integral casting or frame member 110 which is mounted between the sills 10 and supported on the inwardly extending flanges of these channel formed sills. The frame member 110 is provided at opposite sides with vertical flanges 110$^a$ and 110$^b$ fitting between the flanges of the channel sills 10 and bolted thereto. These flange portions are rigidly joined together by means of transverse webs 110$^c$. The casting 110 has a longitudinal hole into which is fitted a shaft 111 which is pinned thereto at 112. The central portion of the frame member 110 is provided with a slot or opening between the webs 110$^c$, and in this opening extends a rocking frame member 113 which is mounted on the shaft 111. The frame member 113 is in the form of a yoke; it has laterally extending arms which also project downwardly a suitable distance below the bottoms of the sills 10 and carry a transverse shaft 114 which is secured to the yoke. The yoke 113 has a central opening 115 within which extends a rocking frame member 116 which is mounted on the shaft 114. This member is in the form of a spider having a pair of rearward diverging branches or arms 117 and a pair of forward diverging branches or arms 118. The branches 117 at their outer ends are rigidly united by a transverse frame portion 119 and in like manner the outer ends of the branches 118 are united by a frame portion 120. The sub-frame structure or spider therefore comprises, at opposite sides of the axes, wheel carrying members formed by the arms 117, 118 and by the transverse portions 119, 120, the members being in the present instance integrally united to form a spider.

Secured to the opposite outer vertical faces of the sills 10 are a pair of guide plates 121, each of which at its lower end is provided with a vertical slot 121$^a$. The transverse shaft 114 projects at opposite ends beyond the sides of the yoke 113 and these projecting ends extend through the slots 121$^a$ which act to guide, and also to limit in both horizontal and vertical directions the rocking frame 113 in its sidewise articulation. It will be understood, of course, that the guide plates 121 serve, in effect, as extensions of the frame, although, in the present instance, they are not formed integrally with the frame. The transverse frame portions 119 and 120 are cut away or slotted at opposite sides beneath the sills 10 at 119$^a$ and 120$^a$ respectively, and these recessed portions determine the extent of endwise and sidewise articulation of the sub-frame structure S. It will be noted (see Figs. 6 and 7) that the lift platform 24 in its lowest position will lie substantially against the top faces of the sills 10. The load wheels 6—9 are so mounted that the upper portions thereof, when the wheels are in normal position, will be a predetermined distance below the lift platform 24. This distance or space is the maximum distance that the wheels will rock vertically either on its sidewise or its endwise articulation. When the load wheels reach their maximum vertical rocking position as shown in Fig. 6 the bottoms of the recesses 119$^a$ and 120$^a$ will engage the bottom portion 10$^a$ of the sills thereby preventing the wheels from engaging and binding against the bottom of the lift platform 24, when the latter is in its lowest position. In like manner when the wheels rock vertically during their sidewise articulation as shown in Fig. 7 the wheels will be prevented from engaging the bottom of the lift platform due to the fact that the bottoms of the recesses 119$^a$ or 120$^a$ will engage the bottom portions 10$^a$ of the sills. Also the projecting ends of the shaft 114 will engage the upper ends 121$^b$ of the guide slots 121$^a$. The sills 10 may be cut away at 122 (see Figs. 6 and 8) in order to provide clearance for the sidewise articulation of the yoke or frame member 113.

In the present instance each wheel structure preferably comprises a pair of independently rotatable wheels 6, 6$^a$; 7, 7$^a$; etc. This construction enables the truck when carrying a heavy load, such as ten tons, to be turned by means of the steering mechanism on a short radius without any substantial binding or skidding effect between the tires and the floor or ground. The construction therefore enables a load to be widely distributed by means of the sets of wheels, each of which turns on a separate radius in which the vertical turning axis of the knuckle or wheel axle is fixed with relation to the load.

Referring to Fig. 10, I have illustrated a manner of mounting the several pairs of load carrying wheels, each pair being preferably identical in construction. The wheels 6 and 6$^a$ comprise outer tire treads fixed to annular steel rims 100 and 100$^a$ respectively, each of which revolves freely and independently on a cylindrical hub or drum 101. The rims 100 and 100$^a$ may be mounted in abutting relation and the inner rim 100$^a$ is held against lateral displacement by means of an annular flange 104. A ring 102 is bolted at 102$^b$ at the outer edge of the drum or bearing 101 and is provided with a flange 102$^a$ which confines the outer edge of the rim 100 preventing lateral displacement thereof. Extending centrally through each of the transverse frame portions 119 and 120 is a fixed shaft 21ª. The ends of each shaft, which project beyond the ends of the frame portions 119 or 120, are split as shown in Fig. 5, and are also tapped to provide a vertical hole through which is threaded a pin 12. The pin 12 is rigidly fixed within the tapped hole in the end of the shaft 21ª by means of a bolt 21ᵇ which clamps the split portions of the shaft on to the pin 12. The pin 12 rests on a ball-bearing 12ª supported by the knuckle sleeve 105, the latter being free to turn about the axis of the pin 12. The drum 101 is provided with a central hub 101ª mounted on the knuckle 105 and between the axle portion 105ª of the knuckle and this hub are interposed suitable tapered roller bearings 106. These parts are held in position by means of a nut 105ᵇ. To the outer face of the hub is secured by means of screws 103ª a cap 103. To the knuckle 105 of each of the load carrying wheels is secured beneath the end of the shaft 21ª one of the steering arms 52, 47, 53 or 49, hereinafter described. From this construction it will be seen that each load wheel structure may be turned when steering the truck about the fixed vertical axis of the pin 12, and each wheel is free to revolve on the projecting axle portion of the knuckle.

It will also be noted that each knuckle with the steering arm 52 (47, 53 and 49) is located interiorly of the drum close to the central vertical axis of the drum passing through the centre of gravity thereof. Each outer tread 6, 7, 8 and 9 is wider than the inner tread 6ª, 7ª, 8ª and 9ª, so that the weight of the load on each pair of wheel treads will be centered on the outer wider tread. The foregoing construction provides a powerful leverage for turning each twin wheel structure which is an important factor in enabling the load carrying wheels to be turned on a short radius without binding on the floor irrespective of the weight of the load.

The several steering knuckles 105, which turn about the vertical axes 12, are therefore journalled to the projecting portions 21ª of the rocking frame S.

Mounted on these knuckles is a steering arm 46 for the wheels 6 and 6ª and a steering arm 47 for the wheels 7 and 7ª. A steering arm 48 is mounted on the knuckles for the wheels 8 and 8ª, and a steering arm 49 is correspondingly provided for the wheels 9 and 9ª. The steering arms 46 and 47 are connected by a transverse rod 50, and the steering arms 48 and 49 are connected by a transverse rod 51. The steering arm 46 is provided with an offset arm portion 52, and the steering arm 48 is provided with an offset arm 53, these offset portions being pivotally joined together by means of a connecting rod 54. The arm 54 is connected to a rearwardly extending rod 55 by means of a ball joint 154. This rod terminates adjacent the rear or driver's end of the truck and is suitably connected to an arm 56 mounted adjacent the lower end of a vertically extending steering post 57. The steering post 57 at its upper end is connected to a horizontally extending stud shaft 58 (see Fig. 1), and this shaft is operated through the medium of reduction gearing (not shown) by means of a steering wheel 5.

The rear or driving wheels 11 are also mounted on steering knuckles 13 so as to turn relative to the chassis frame. Connected to the axle spindles of the driving wheels 11 are steering arms 59 and 60, which are connected together by means of a transverse rod or link 61. The arm 60 is provided with an offset arm 62 which is connected to the steering post 57 by means of a link 63 and an arm 64, as shown in Fig. 9.

The steering arms of the load carrying wheels and the driving wheels are constructed of varying lengths whereby the steering mechanism may be operated to cause all of the wheels to turn simultaneously on diverging radii having substantially a common turning centre or locus 70, see Figures 4 and 5. The turning centre 70 at all times lies in a line 71 extending at right angles to the central longitudinal axis 72 of the truck, and this locus line 71 extends intermediate the normal axes of the front or driving wheels 11 and the intermediate sets of wheels 8, 8ª, 9 and 9ª, and as a result of this construction an extremely short turning radius may be obtained, as shown in Fig. 4.

It will be particularly noted that by mounting the load carrying wheels upon the rocking sub-frame S, these wheels are permitted to yield vertically when encountering uneven ground or inclined surfaces, so that the weight of the load will at all times be distributed to these wheels and permit the truck with capacity loads to be propelled on uneven ground without difficulty.

What I claim is:

1. In an industrial power driven truck, a low mounted main frame having transversely spaced forwardly extending side bars and at its rear end an upwardly extending housing, driving wheels beneath said housing, a vertically movable platform above said side bars, means for raising and lowering said platform and a springless front wheel supporting unit comprising a horizontally extending shaft secured to said frame against bodily movement relative to the frame beneath the platform and disposed in a vertical plane extending between the side bars, a rocking member mounted on said shaft and having arms extending therefrom, wheel carrying member pivotally carried by said arms for rocking movement about an axis at right angles to the rocking movement of said member, whereby the member may rock on the frame in one vertical plane and the wheel carrying members may pivot on said rocking member in vertical planes at right angles thereto, one of said vertical planes extending longitudinally of the truck and the other extending transversely thereof, said wheel carrying members having portions outside the side bars, two forwardly and rearwardly spaced pairs of relatively small ground-engaging wheels carried by said members outside said frame bars and beneath the platform at opposite sides of the longitudinal axis, means for mounting each wheel for dirigible movement about an independent axis, and means for securing said wheels.

2. In an industrial power driven truck, a low mounted main frame having transversely spaced forwardly extending side bars and at its rear end an upwardly extending housing, driving wheels beneath said housing, a vertically movable platform above said side bars, means for raising and lowering said platform and a springless front wheel supporting unit comprising a horizontally extending shaft secured to said frame against bodily movement beneath the platform and disposed in a vertical plane extending between the side bars, a rocking member mounted on said shaft and having arms extending laterally therefrom, the shaft extending through said member, wheel carrying members pivotally carried by said rocking member arms for rocking movement about an axis at right angles to the rocking movement of said member, whereby the member may rock on the frame in one vertical plane and the wheel carrying members may pivot on said rocking member in vertical planes at right angles thereto, one of said vertical planes extending longitudinally of the truck and the other extending transversely thereof, said wheel carrying members having portions outside the side bars, two forwardly and rearwardly spaced pairs of relatively small ground-engaging wheels carried by said members beneath the platform and outside said frame bars at opposite sides of the longitudinal axis, and means for mounting each wheel for dirigible movement about an independent axis, and means for steering said wheels.

3. An industrial power driven truck comprising a low mounted main frame, the frame being provided at its rear end with an upwardly extending housing, driving wheels beneath said housing, a vertically movable platform above said frame, means for raising and lowering said platform and a springless load-wheel carrying unit for said frame beneath said platform comprising a shaft secured to said frame and fixed against bodily movement relative thereto, a rocking member carried by said shaft beneath the platform for pivotal movement in a vertical plane, wheel carrying members carried by said rocking member and pivotally movable thereon in vertical planes, the axes of said rocking member and of said wheel carrying members being at right angles to one another, one being disposed longitudinally of the truck and the other transversely of the truck, two pairs of relatively small ground-engaging wheels spaced, respectively, forwardly and rearwardly of the transverse axis with the individual wheels of each pair being disposed, respectively, at opposite sides of the longitudinal axis, all of said wheels being located entirely beneath the platform and limited against upward rocking movement whereby to be maintained out of engagement with said platform, means for mounting each wheel upon said sub-frame members for dirigible movement about an independent axis, and means for steering all of said wheels.

4. An industrial power driven truck comprising a low mounted main frame having transversely spaced side bars, the frame being provided at its rear end with an upwardly extending housing, driving wheels beneath said housing, a vertically movable platform above said frame, means for raising and lowering said platform and a springless load-wheel carrying unit fixed against bodily movement relative to the frame beneath said platform comprising a rocking member carried by said frame bars beneath the platform for pivotal movement in a vertical plane on an axis fixed against bodily movement relative to the frame, wheel carrying members carried by said rocking member and pivotally movable thereon in vertical planes, said members having portions outside said bars, the axes of said rocking member and of said wheel carrying members being at right angles to one another, one being disposed longitudinally of the truck and the other transversely of the truck, two pairs of relatively small ground-engaging wheels spaced, respectively, forwardly and rearwardly of the transverse axis with the individual members of each pair being disposed, respectively, at opposite sides of the longitudinal axis, all of said wheels being located entirely beneath the platform outside said frame bars, and means for mounting each wheel upon said sub-frame members for dirigible movement about an independent axis.

5. An industrial power driven truck comprising a low mounted main frame having transversely spaced side bars, the frame being provided at its rear end with an upwardly extending housing, driving wheels beneath said housing, a vertically movable platform above said frame, means for raising and lowering said platform and a springless load-wheel carrying unit beneath said platform comprising a rocking member carried by said frame bars beneath the platform for pivotal movement in a vertical plane about an axis fixed against bodily movement relative to the frame, wheel carrying members carried by said rocking member and pivotally movable thereon in vertical planes, the axes of said rocking member and of said wheel carrying members being at right angles to one another, one being disposed longitudinally of the truck and the other transversely of the truck, said members having portions outside the frame bars, two pairs of relatively small ground-engaging wheels spaced, respectively, forwardly and rearwardly of the transverse axis with the individual members of each pair being disposed, respectively, at opposite sides of the longitudinal axis, all of said wheels being located entirely beneath the platform outside said frame bars, means on said frame for limiting rocking movement whereby to maintain the wheels out of engagement with the platform, and means for mounting each wheel upon said sub-frame members for dirigible movement about an independent axis.

6. In an industrial power driven truck, a low mounted main frame having transversely spaced side bars and at its rear end an upwardly extending housing, driving wheels beneath said housing, a vertically movable platform above said side bars, means for raising and lowering said platform, a rocking member carried by said side bars beneath the platform for pivotal movement in a vertical plane about an axis extending longitudinally of the truck and fixed against bodily movement relative to the frame, wheel carrying members carried by said rocking member and pivotally movable thereon about an axis extending transversely of the truck, said members having portions outside said frame bars, two pairs of relatively small ground-engaging wheels disposed entirely beneath said platform outside said frame side bars, whereby the frame may limit rocking movement and spacer, respectively, forwardly and rearwardly of said transverse axis, the individual wheel of said pairs being disposed on opposite sides of the longitudinal axis, and means for mounting each of said wheels for dirigible movement about independent axes.

In testimony whereof I affix my signature.

ROBERT T. ROMINE.